United States Patent
Kassim Shaari et al.

(10) Patent No.: US 8,501,826 B2
(45) Date of Patent: Aug. 6, 2013

(54) PROCESS FOR THE PRODUCTION OF POLYURETHANE PRODUCTS

(75) Inventors: Norin Zamiah Bt. Kassim Shaari, Kuala Lumpur (MY); Tuan Noor Maznee Bt. Tuan Ismail, Kuala Lumpur (MY); Hazimah Abu Hassan, Kuala Lumpur (MY); Ooi Tian Lye, Kuala Lumpur (MY); Salmiah Ahmad, Kuala Lumpur (MY)

(73) Assignee: Malaysian Palm Oil Board, Kajang (MY)

( * ) Notice: Subject to any disclaimer, the term of this patent is extended or adjusted under 35 U.S.C. 154(b) by 1836 days.

(21) Appl. No.: 11/462,010

(22) Filed: Aug. 2, 2006

(65) Prior Publication Data

US 2007/0110877 A1  May 17, 2007

(30) Foreign Application Priority Data

Aug. 4, 2005  (MY) .............................. PI20053628

(51) Int. Cl.
- *C08J 9/00* (2006.01)
- *C08G 18/28* (2006.01)
- *C08G 18/08* (2006.01)
- *C08G 18/16* (2006.01)

(52) U.S. Cl.
USPC ............. 521/50; 521/104; 521/170; 521/174; 528/48; 528/85

(58) Field of Classification Search
USPC ............. 521/170, 172, 174, 50, 104; 528/48, 528/85
See application file for complete search history.

(56) References Cited

U.S. PATENT DOCUMENTS

| | | | | |
|---|---|---|---|---|
| 4,826,944 | A | * | 5/1989 | Hoefer et al. .................. 528/49 |
| 4,886,893 | A | * | 12/1989 | Meffert et al. ................ 549/562 |
| 6,107,433 | A | * | 8/2000 | Petrovic et al. .................. 528/1 |
| 6,433,121 | B1 | * | 8/2002 | Petrovic et al. .................. 528/1 |
| 6,573,354 | B1 | * | 6/2003 | Petrovic et al. .................. 528/1 |
| 6,686,435 | B1 | * | 2/2004 | Petrovic et al. ................ 528/44 |
| 7,674,925 | B2 | * | 3/2010 | Garrett et al. .................. 554/26 |
| 7,691,914 | B2 | * | 4/2010 | Abraham et al. ............. 521/172 |
| 2005/0070620 | A1 | * | 3/2005 | Herrington et al. ........... 521/155 |
| 2009/0216040 | A1 | * | 8/2009 | Benecke et al. .............. 560/155 |

OTHER PUBLICATIONS

Nakamura et al., Kobunshi Ronbunshu, Preparation of Polyurethane Foam From Waste Vegetable Oil, 50 (11), pp. 881-886, (1993).*

* cited by examiner

*Primary Examiner* — Michael Pepitone
(74) *Attorney, Agent, or Firm* — Workman Nydegger

(57) ABSTRACT

The present invention relates to a process for obtaining polyols from used frying oils as the starting ingredient and converting the polyols to polyurethane products. The process comprises few steps such as epoxidation process by reacting used frying oil with an acid, reacting the epoxidized used frying oil with a monohydric or polyhydric alcohol in the presence of a catalyst to form a polyols, mixing the polyols with an additive or additives and a blowing agent or blowing agents and mixing the blended polyol with an isocyanate to form a polyurethane product.

20 Claims, No Drawings

PROCESS FOR THE PRODUCTION OF POLYURETHANE PRODUCTS

FIELD OF INVENTION

The present invention relates to a process for obtaining polyols from used frying oils as the starting ingredient and converting the polyols to polyurethane products.

BACKGROUND OF INVENTION

Repeated food-frying cycles subject cooking oils vegetable-based oils or animal-based oils to extreme temperature swings and aeration, which quickly lead to a runaway decomposition profile, resulting in a severely limited frying lifetime. Therefore, this used frying oil is generally discarded when an unacceptable deterioration in food quality is experienced.

Quite often, used (spent) oils are improperly disposed of by washing the used oils down the plumbing or by dumping them down the storm drain system. Improperly disposing of used oils may cause property damage, health hazards and environmental problems. Over time, used oils rinsed down the plumbing system build up and eventually block the entire pipe, causing sewer back ups. As sewer pipes back up, sewage and food particles that accumulate can attract insects and other vermin and may create potential health hazards. Clogged sewers can also lead to overflows. As sewage overflows onto the streets, it enters the storm drain system, where it is then carried straight into our local streams and creeks without any treatment. Polluted storm water runoff can lead to costly maintenance and clean up and could result in severe fines from regulatory bodies.

Accordingly, it is an object of this invention to provide a process for obtaining polyols from used frying oils as the starting ingredient and converting the polyols to useful polyurethane products.

It is a further object of this invention to provide a process for obtaining polyols from used frying oils as the starting ingredient and converting the polyols to useful polyurethane products.

SUMMARY OF INVENTION

Accordingly, the present invention provides a process for preparing polyurethane foams from used frying oil, the process comprising reacting used frying oil with an acid such as peroxyacetic acid or performic acid at a temperature of less than 70° C., and at atmospheric pressure, reacting the epoxidised used frying oil with a monohydric or polyhydric alcohol in the presence of a catalyst to form a polyol at a temperature of less than 90° C., and at atmospheric pressure, wherein the mole ratio between the monohydric or polyhydric alcohol with unsaturated bonds present in the used frying oil that has been converted into epoxide rings to form epoxidised used frying oil being $\geq 1:3$, mixing the polyol with at least one additive and at least one blowing agent at a temperature of less than 30° C., and at atmospheric pressure and mixing the blended polyol with an isocyanate at a temperature of less than 30° C., and at atmospheric pressure to form the said polyurethane foams.

Further it is also provided a process for preparing polyurethane products such as coatings and adhesives from used frying oil, the process comprising reacting used frying oil with an acid such as peroxyacetic acid or performic acid at a temperature of less than 70° C., and at atmospheric pressure, reacting the epoxidised used frying oil with a monohydric or polyhydric alcohol in the presence of a catalyst to form a polyols at a temperature of less than 90° C., and at atmospheric pressure, wherein the mole ratio between the monohydric or polyhydric alcohol with unsaturated bonds present in the used frying oil that has been converted into epoxide rings to form epoxidised used frying oil being $\geq 1:3$, mixing the polyol with at least one additive at a temperature of less than 30° C., and at atmospheric pressure and mixing the blended polyol with an isocyanate at a temperature of less than 30° C., and at atmospheric pressure to form the said polyurethane products.

DETAILED DESCRIPTION OF THE PREFERRED EMBODIMENTS

The present invention relates to a process for obtaining polyols from used frying oils as the starting ingredient and converting the polyols to polyurethane products. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The process for obtaining polyols from used frying oils as the starting ingredient and converting the polyols to polyurethane products of the present invention comprises a number of steps.

First, epoxidised used flying oil is prepared by reacting the used frying oil with an acid. For this purpose, peroxyacetic acid or performic acid, which are generated in-situ, are found suitable. Further discussion of the present invention in this specification will be based on peroxyacetic acid. This epoxidation step is conducted at a temperature of less than 70° C., most preferably at 65° C. to 70° C. and at atmospheric pressure.

The epoxidation process involves formation of peroxyacetic acid by reacting glacial acetic acid with hydrogen peroxide (35% to 60%) in the presence of a catalyst. A ratio of 2.06:1 glacial acetic acid to hydrogen peroxide of 30% concentration in the presence of 1% to 2% catalyst is found to give the highest peroxyacetic acid content. Once the formation of peroxyacetic acid is completed, the catalyst is neutralised with sodium acetate and the actual weight of peroxyacetic acid available in the mixture is calculated.

The iodine value of the oil to be epoxidised is determined by using AOCS Official Method Da 15-48 or any other methods known to the persons skilled in the art. The iodine value measures the degree of unsaturation present in the used frying oil. Based on the fact that one mole of peroxyacetic acid will react with one mole of unsaturated bonds present in the used frying oil, the amount of peroxyacetic acid to fully react with the available peroxyacetic acid is calculated, weighed and added to peroxyacetic acid.

Peroxyacetic acid reacts with the unsaturated bonds present in the used frying oil to form epoxide rings. After the epoxidation is completed, which is determined by the presence of the oxirane oxygen content of the reduction in peroxyacetic acid content, the spent acid is removed. The epoxidised oil is then washed until neutral and dried. The product formed during this process is known as epoxidised used frying oil.

Later, the epoxidised used frying oil is reacted with a monohydric or polyhydric alcohol in the presence of a catalyst to form a polyol wherein the mole ratio of the monohydric or polyhydric alcohol to unsaturated bonds present in the used frying oil that has been converted into epoxide rings to form epoxidised used frying oil is $\geq 1:3$. This step is conducted at a temperature of less than 90° C., most preferably at 60° C. to 65° C. and at atmospheric pressure.

In the preferred embodiment of the present invention, the preferred monohydric or polyhydric alcohol is glycerol (99%), ethylene glycol or propylene glycol, most preferably ethylene glycol. An example of the catalyst, which can be used is a composition of boron trifluoride in ether.

The mole ratio of monohydric or polyhydric alcohol to unsaturated bonds present in the used frying oil that has been converted into epoxide rings to form epoxidised used frying oil is in the range of 1:0, 6:1, 5:1, 4:1, 3:1, 2:1, 1:1, 1:2 or 1:3. However, the preferred ratios to obtain maximum input are 3:1, 2:1, 1:2 and 1:3.

Later, the polyols obtained from the earlier step are mixed with an additive or a combination of additives and a blowing agent or a combination of blowing agents. This step is conducted at a temperature of less than 30° C., most preferably at room temperature and at atmospheric pressure.

Blowing agents are required in the process of production of polyurethane foams only. In the production of other types of polyurethane products such as coatings and adhesives, blowing agents are not required.

Additives are added to control and modify the final properties of polyurethane polymer, to increase the rate of reaction, to improve the foam structure/performance, to assist demoulding and/or to retard flammability. The additives used in the present invention are selected from silicone surfactant such as Niax L603, amine catalyst such as triethylene diamine in dipropylene glycol (e.g. A33), tin catalyst, flame retardant, pigment, cross linkers and chain extender.

Particularly, surfactant is added to control cell size of the polyurethane foams, catalysts are added to accelerate the blowing and gelling reactions in the polymerisation process, cross linkers are for branching and crosslinking, chain extender is to increase the size of the rigid segment and hydrogen bond density, flame retardant is to reduce rate of burning and the pigment is to introduce colour to the polyurethane foams. The amount of additives used in the process will be in the region of 0 to 50 parts per hundred polyol (pphp). It must be noted that the selection of the additives is dependent on the end application of the polyurethane products.

Blowing agents are added to generate the cell structure of the foam. There are two types of blowing agents, which are chemical blowing agents and physical blowing agents. An example of chemical blowing agents is water and examples of physical blowing agents are methylene chloride, hydrochlorofluorocarbon-141b (HCFC-141b), pentane and cyclopentane. In the preferred embodiment of the present invention, water is selected as the only blowing agent and the amount of the water required will be 1 to 5 pphp. If a combination of water and methylene chloride is used as the blowing agent, the amount of methylene chloride is 0 to 20 pphp, whereas if a combination of water and HCFC-141b is used as the blowing agent, the amount of and HCFC-141b is 0 to 20 pphp.

Persons skilled in art appreciate that water reacts with diisocyanates to form unstable carbamic acid, which decomposes to urea and carbon dioxide. Carbon dioxide obtained from the aforesaid step provides the expansion or generates the cell structure of foam.

In the prior art, polyurethane prepolymers having excess isocyanates are produced to avoid viscosity increase during the storage of polyols. It must be appreciated that the polyols in the present invention are produced only prior to their reaction with the isocyanate and subsequent formation of the polyurethane foams. Accordingly, the present invention will not face the viscosity problem, as the polyurethane prepolymers will not be required.

Finally, the blended polyols are mixed with an isocyanate to form polyurethane products. This step is conducted at a temperature of between 25° C. to 30° C., preferably at room temperature and at atmospheric pressure. Several aromatic and aliphatic diisocyanates are available. The preferred isocyanates are toluene diisocyanates (TDI) and methylene diphenyl diisocyanates (MDI). The most preferred isocyanate is MDI, as TDI is highly volatile.

In the preferred embodiment of the present invention, the polyols obtained from the epoxidised used frying oil are allowed to react with MDI with vigorous stirring. The mixing is done at 2000 rpm until the mixture turns creamy. Water is used as the only blowing agent in this process. The polyols react with MDI to form polyurethane polymers while the presence of water helps in the generation of carbon dioxide in-situ thus resulting in the formation of cell structures or foams. The polyols are prepared just prior to the production of the said polyurethane foams.

As mentioned earlier, water reacts with diisocyanates to form unstable carbamic acid, which decomposes to urea and carbon dioxide and the carbon dioxide provides the expansion or generates the cell structure of foam. It was found that the amount of carbon dioxide produced in this step is directly proportional to the amount of water used. Accordingly, by having a higher amount of water in this step, and therefore producing a higher amount of carbon dioxide, the structures and density of the polyurethane foams can be improved.

Mould releasing agents are also used for easy removal of the cured polyurethane foams from the moulds.

By selecting the mole ratio between the monohydric or polyhydric alcohol and unsaturated bonds present in the used frying oil that has been converted into epoxide rings to form epoxidised used frying oil, and the type and concentration of the additives used, the hydroxyl value of the polyols and thereby the nature of the polyurethane foams may be predictably forecast.

The present invention allows the production of the polyurethane products for use as thermal insulators, construction materials, furniture, bedding, cushion, packaging materials, coating material, adhesives and many other varied applications.

It must be appreciated that the used frying oil used in the present invention can be obtained from vegetable sources such as palm oil or soybean oil and from animal sources.

The following example is intended to further illustrate the invention, without any intent for the invention to be limited to the specific embodiment described therein.

In the in-situ production of peroxyacetic acid, glacial acetic acid and 1% to 2% sulphuric acid, which is used as a catalyst, are mixed together in an apparatus that has been passivated and equipped with a stirrer and condenser. The mixture is stirred for about 30 minutes. Hydrogen peroxide is added to the mixture dropwise with continuous stirring. The concentration of hydrogen peroxide used in this step ranges from 35% to 60%. However, for the purpose of this example, a 50% concentration is used. It is noted that the temperature of the reaction increases with the addition of hydrogen peroxide. Accordingly, it is wise to control the addition rate of the hydrogen peroxide so that the temperature of the reaction is not allowed to exceed 45° C. After the addition of hydrogen peroxide is completed, the mixture is stirred until a maximum percentage of peroxyacetic acid is formed or when the hydrogen peroxide has been exhausted. This normally takes about 4 hours. The maximum percentage of peroxyacetic acid obtained ranges from 14% to 22% depending on the concentration of hydrogen peroxide used. Once the maximum percentage of peroxyacetic acid is obtained, the catalyst is neutralised with an appropriate amount of sodium acetate. It is added to the reaction mixture and stirred for 1 hour.

Based on the percentage of peroxyacetic acid obtained and assuming that one mole of peroxyacetic acid will react with one mole of unsaturated bonds present in the used frying oil, the maximum amount of used frying oil that can react with the available peroxyacetic acid is calculated. For a given amount of peroxyacetic acid, the maximum amount of used frying oil that can be epoxidised will vary depending on the unsaturated bonds present in the used frying oil. The higher the degree of unsaturation, the lower the amount of epoxidised used frying oil will be obtained.

The peroxyacetic acid is added slowly to the used frying oil with continuous stirring. The temperature of the reaction will slowly increase with the addition of peroxyacetic acid. The rate of addition is controlled in such a way that the temperature of the reaction is not allowed to exceed 70° C. A constant rate of addition may be properly controlled if the temperature of the reaction is maintained between 55° C. to 65° C.

Once the addition of peroxyacetic acid to the used frying oil is completed, the mixture is stirred for an additional 30 minutes. The presence of epoxide rings indicates that reaction has taken place. The stirring is stopped and the epoxidised used frying oil is separated from the peroxyacetic acid. The spent peroxyacetic acid is removed and the epoxidised used frying oil is washed several times with water until it is neutralised. The epoxidised used frying oil is then dried using anhydrous sodium sulphate if the amount is small, or using a vacuum dryer if the quantity is large. The required moisture content of the epoxidised used frying oil is 0.1 to 0.2%.

In the production of polyols, the appropriate amount of epoxidised used frying oil and ethylene glycol are weighed and placed into a heat resistant and non-breakable container (equipped with stirrer). The mixture is heated to 60-65° C. After which, 1% of total weight (amount of ethylene glycol and epoxidised used frying oil) of boron trifluoride in diethyl ether (48%) is added to the mixture and the mixture is stirred vigorously (>1000 rpm). The reaction takes about 30-45 minutes to complete. The product formed is a polyol.

For the production of small scale free-rise flexible polyurethane foam, 100 g of the polyol is weighed and added into another heat resistant and non-breakable container. Then, additives with certain amount such as 1.0 g of L603, 1.5 g of A33, 0.5 g of dimethyl phthalate and 0.2 g of tin catalyst are added to the polyols. 4.0 g water which acts as the blowing agent is also added to the mixture. The mixture is vigorously stirred at 2000 rpm until all the additives are thoroughly mixed with the polyol and mixture turns creamy. Next, 70 g of MDI is added and the vigorous stirring continued until bubbles begin to appear. The stirring is then stopped and the stirrer is removed. The foam is allowed to rise freely in the container. The foaming characteristic such as tack free time is recorded.

The foam is allowed to cure at room temperature for 1 day before it is cut into test specimen for physical testing. The physical tests are performed according to standard methods:

Density—the density is calculated from expression: weight (kg)/volume ($m^3$).

Percentage open-cell content—The test is conducted by using Micromeritics AccuPyc 1330 Pycnometer. The test is comparable particularly to ASTM D2856.

Compressive stress—this is the hardness at 40% strain from the compression hardness test. The test is conducted according to DIN 53 577.

Hysteresis—it measures the area between loading and unloading curves plotted on the stress vs. strain curve during the compression hardness test according to DIN 53 577.

Typical results of the properties of free-rise flexible polyurethane foams: tack free time (ranging from 5 to 6 minutes), density (ranging from 40 to 50 kg/$m^3$), percentage open cell content (ranging from 95 to 96%) and hysteresis (ranging from 56 to 60%).

However, it may be noted that the procedure involved in the production of moulded flexible polyurethane foams varies slightly from that of free-rise polyurethane foams. In this procedure, a suitable mould is selected (e.g. 35 cm×35 cm×4.5 cm internal measurement, 45 cm×45 cm×10 cm external measurement, aluminium block with cover, 44.3 cm×44.3 cm×5 cm). The mould is thoroughly lubricated with a suitable releasing agent, preferably silicone-based. 300 g of polyols is weighed and added into a heat resistant and non-breakable container. Then, additives with certain amount such as 3.0 g silicone surfactant, 4.5 g amine catalyst, 1.5 g dimethyl phthalate and 0.6 g tin catalyst are added to the polyols. Then, 12 g water is added to the mixture.

The invention claimed is:

1. A process for preparing polyurethane foams from used frying oil, the process comprising:
   (a) reacting used frying oil with an acid at a temperature of less than 70° C., and at atmospheric pressure to form an epoxidised used frying oil;
   (b) reacting the epoxidised used frying oil with a monohydric or polyhydric alcohol in the presence of a catalyst to form a used frying oil-derived polyol at a temperature of less than 90° C., and at atmospheric pressure, the mole ratio between the monohydric or polyhydric alcohol with unsaturated bonds present in the used frying oil that has been converted into epoxide rings to form epoxidised used frying oil being $\geq 1:3$;
   (c) mixing the used frying oil-derived polyol with at least one additive and at least one blowing agent at a temperature of less than 30° C., and at atmospheric pressure to form a polyol mixture consisting essentially of the used frying oil-derived polyol, the at least one additive, and the at least one blowing agent; and
   (d) mixing the polyol mixture with an isocyanate at a temperature of less than 30° C., and at atmospheric pressure to form a polyurethane foam in which the polyol that is reacted with the isocyanate to form the polyurethane foam consists essentially of the used frying oil-derived polyol.

2. The process as claimed in claim 1, wherein the used frying oil is obtained from vegetable sources and/or from animal sources and has been subjected to temperature swings and aeration during repeated food-frying cycles.

3. The process as claimed in claim 1, wherein the acid comprises peroxyacetic acid or performic acid generated in-situ.

4. The process as claimed in claim 1, wherein in step (b) the epoxidised used frying oil is reacted with a polyhydric alcohol selected from the group consisting of glycerol (99%), ethylene glycol, propylene glycol, and combinations thereof.

5. The process as claimed in claim 1, wherein the catalyst is a composition of boron trifluoride in ether.

6. The process as claimed in claim 1, wherein the at least one blowing agent is selected from the group consisting of water, methylene chloride, hydrochlorofluorocarbon-141b (HCFC-141b), pentane, and cyclopentane.

7. The process as claimed in claim 1, wherein the at least one additive is selected from the group consisting of silicone surfactant, amine catalyst, tin catalyst, flame retardant, pigment, cross linkers, and chain extender.

8. The process as claimed in claim 1, wherein the isocyanate is selected from the group consisting of toluene diisocyanates (TDI) and methylene diphenyl diisocyanates (MDI).

9. Polyurethane foam obtained from a process according to claim 1.

10. An article of manufacture comprising the polyurethane foam according to claim 9, wherein the article of manufacture is selected from the group consisting of thermal insulators, construction materials, furniture, bedding, cushion, packaging material, coating material, and adhesives.

11. A process for preparing polyurethane products from used frying oil, the process comprising:
   (a) reacting used frying oil produced by repeated food-frying cycles involving temperature swings and aeration with an acid at a temperature of less than 70° C., and at atmospheric pressure to form an epoxidised used frying oil;
   (b) reacting the epoxidised used frying oil with a monohydric or polyhydric alcohol in the presence of a catalyst to form a used frying oil-derived polyol at a temperature of less than 90° C., and at atmospheric pressure, wherein the mole ratio between the monohydric or polyhydric alcohol with unsaturated bonds present in the used frying oil that has been converted into epoxide rings to form epoxidised used frying oil being $\geqq 1:3$;
   (c) mixing the used frying oil-derived polyol with at least one additive at a temperature of less than 30° C., and at atmospheric pressure to form a polyol mixture; and
   (d) mixing the polyol mixture with an isocyanate at a temperature of less than 30° C., and at atmospheric pressure to form a polyurethane product.

12. The process as claimed in claim 11, wherein the used frying oil is obtained from vegetable sources and/or from animal sources.

13. The process as claimed in claim 11, wherein the acid comprises peroxyacetic acid or performic acid generated in-situ.

14. The process as claimed in claim 11, wherein in step (b) the epoxidised used frying oil is reacted with a polyhydric alcohol selected from the group consisting of glycerol (99%), ethylene glycol, propylene glycol, and combinations thereof.

15. The process as claimed in claim 11, wherein the catalyst is a composition of boron trifluoride in ether.

16. The process as claimed in claim 11, wherein the at least one additive is selected from the group consisting of silicone surfactant, amine catalyst, tin catalyst, flame retardant, pigment, cross linkers, and chain extender.

17. The process as claimed in claim 11, wherein the isocyanate is selected from the group consisting of toluene diisocyanates (TDI) and methylene diphenyl diisocyanates (MDI).

18. Polyurethane product in the form of a coating or adhesive, wherein the polyurethane product is obtained from a process according to claim 11.

19. A process for preparing polyurethane foams from used frying oil, the process comprising:
   (a) reacting used frying oil produced by repeated food-frying cycles involving temperature swings and aeration with an acid at a temperature of less than 70° C., and at atmospheric pressure to form an epoxidised used frying oil;
   (b) reacting the epoxidised used frying oil with a monohydric or polyhydric alcohol in the presence of a catalyst to form a used frying oil-derived polyol at a temperature of less than 90° C., and at atmospheric pressure, the mole ratio between the monohydric or polyhydric alcohol with unsaturated bonds present in the used frying oil that has been converted into epoxide rings to form epoxidised used frying oil being $\geqq 1:3$;
   (c) mixing the used frying oil-derived polyol with at least one additive and at least one blowing agent at a temperature of less than 30° C., and at atmospheric pressure to form a polyol mixture; and
   (d) mixing the polyol mixture with an isocyanate at a temperature of less than 30° C., and at atmospheric pressure to form a polyurethane foam.

20. A process for preparing polyurethane products from used frying oil, the process comprising:
   (a) reacting used frying oil with an acid at a temperature of less than 70° C., and at atmospheric pressure to form an epoxidised used frying oil;
   (b) reacting the epoxidised used frying oil with a monohydric or polyhydric alcohol in the presence of a catalyst to form a used frying oil-derived polyol at a temperature of less than 90° C., and at atmospheric pressure, the mole ratio between the monohydric or polyhydric alcohol with unsaturated bonds present in the used frying oil that has been converted into epoxide rings to form epoxidised used frying oil being $\geqq 1:3$;
   (c) mixing the used frying oil-derived polyol with at least one additive at a temperature of less than 30° C., and at atmospheric pressure to form a polyol mixture consisting essentially of the used frying oil-derived polyol, and the at least one additive; and
   (d) mixing the polyol mixture with an isocyanate at a temperature of less than 30° C., and at atmospheric pressure to form a polyurethane product in which the polyol that is reacted with the isocyanate to form the polyurethane product consists essentially of the used frying oil-derived polyol.

* * * * *